3,099,486
SAFETY CAR SEAT
Edwin Paul Scott, 3610 Lexington Road,
St. Matthews, Ky.
Filed Nov. 9, 1959, Ser. No. 851,783
1 Claim. (Cl. 297—389)

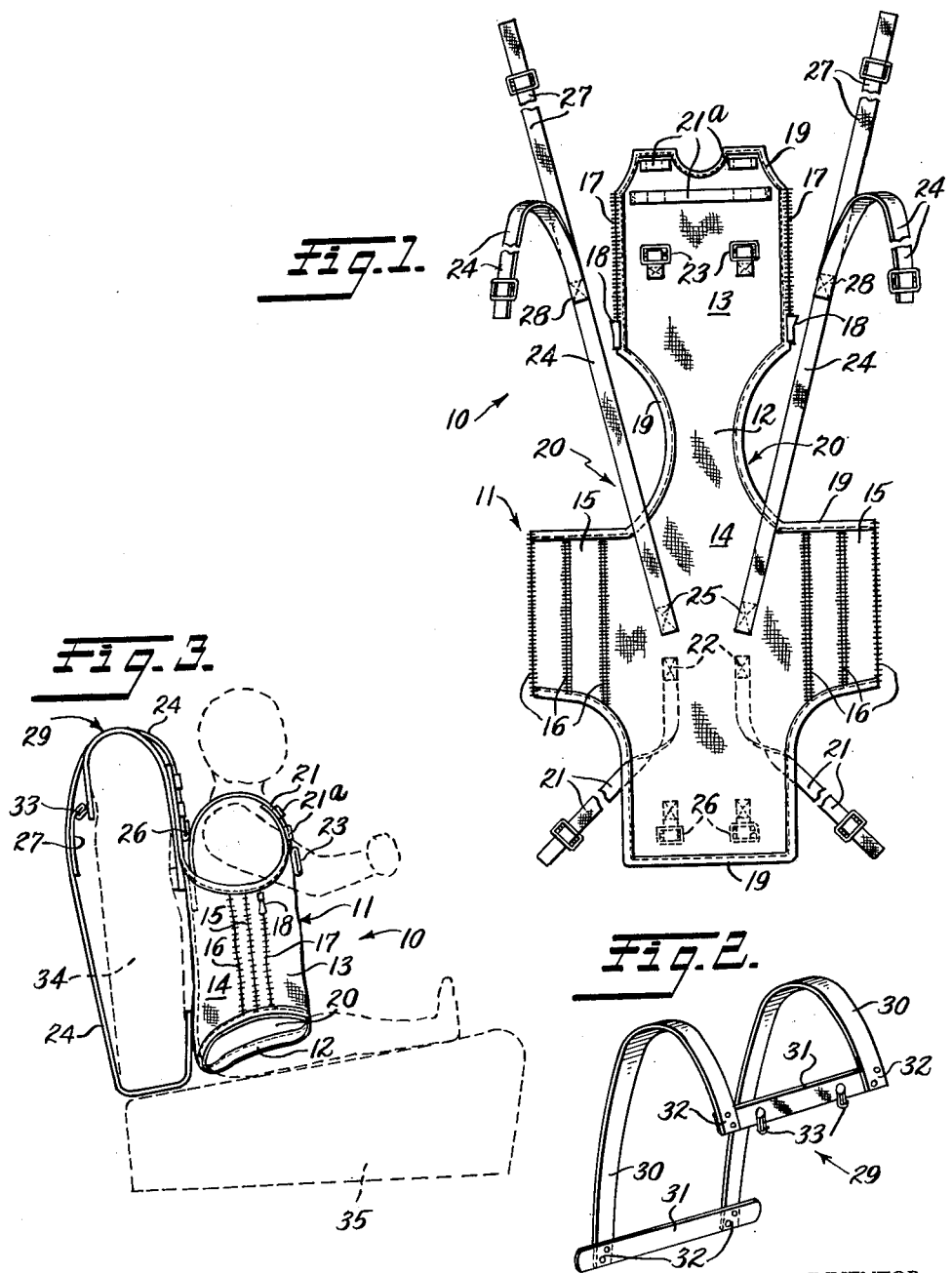

The present invention relates to a safety car seat for infants or small children in which the child is positioned upon the seat of the car adjacent the back of the car seat within a sack which is releasably closed at the sides and has a pair of lower leg openings with the top of the sack having straps extending across the same to hold the child in the sack. The sack is positioned with respect to the back of the car seat by means of belts or straps which extend downwardly from the back of the sack and encircle the back of the car seat and which are secured to the top of the back of the sack and also to a hanger which is draped over the back of the car seat.

An object of the invention is the provision of a safety car seat which will hold a child in normal anatomical sitting position and which will function as a safety seat and belt preventing the child from being thrown forwardly upon impact.

A further object of the invention is the provision of a safety car seat which lies flat on the automobile seat when open and not in use and which, therefore, does not interfere with a person sitting upon that portion of the car seat occupied by the safety seat.

Another object of the invention is the provision of a safety car seat, as aforesaid, in which the safety seat is positioned by a hanger which ties the back of the non-driver seat to the back of the driver seat in those vehicles having split front seats thereby reducing the danger that the child will be thrown forward on sudden impact.

Still another object of the invention is the provision of a safety car seat of the character indicated which can be adjusted for use with children of various size such as infants of from 4–6 months in age to children up to about 3–5 years of age and which is adapted to ease the problem of placing the child in the seat.

Other and further objects of the invention will be apparent from the description which follows taken in conjunction with the accompanying drawing in which:

FIG. 1 is a plan view of an illustrative preferred safety seat constructed in accordance with the invention;

FIG. 2 is a perspective view of a metal hanger constructed in accordance with the invention; and FIG. 3 is a side elevation of the assembled safety car seat and hanger in use, the car seat and back and the child being shown in dotted lines.

Referring more particularly to the drawings, the safety seat of the invention is generically identified by the numeral 10 and comprises a flexible sack body 11 which is desirably formed of canvas duck cloth or other woven fabric of suitable strength. The sack body 11 is formed to define a crotch portion 12, a front or chest portion 13 and a back portion 14 which is laterally widened to form side portions 15.

The side portions 15 are provided with securing which coact with corresponding securing means positioned at the sides of the chest portion 13. In the preferred construction illustrated, zippers are shown but other securing means such as ties, buckles, buttons, etc., may be used. The side portions 15 preferably carry a plurality of laterally spaced rows of securements, e.g., zipper rows 16, which coact with zipper rows 17 at the sides of the chest portion 13, the rows 17 carrying the zipper slide 18. In preferred construction the side securement is adjustable to vary the circumference of the sack.

The fabric constituting the sack body 11 is desirably formed in a single piece bound with bias tape 19.

When the sack body 11 is closed at the sides, the crotch portion 12 and the side portions 15 define a pair of leg-receiving openings 20. The top of the sack 20 produced is open to permit the head, shoulders and arms of the child to pass through.

Belts or straps 21 are secured to the back portion 14 and indicated at 22. The straps 21 are shoulder straps.

Belts or straps 24 are secured to the back portion 14 as indicated at 25. The straps 24 may be termed seat straps and these extend downwardly to encircle the back of seat and are secured to hooks or buckles 26 fastened at the top of the back portion 14.

Hanger straps 27 are secured to the straps 24 intermediate the length thereof, as indicated at 28. As will later more fully appear, the presence of the hanger straps 27 prevents the child from standing thereby keeping the child in a safe sitting position in which the child cannot interfere with or distract the driver.

The hanger 29 shown in FIG. 2 is constituted by a pair of laterally spaced arcuate metal straps 30, desirably spring steel, which are draped over the back of the chair seat. The straps 30 are rigidly interconnected at at least two points along the length thereof by cross pieces 31. A riveted connection identified at 32 may be used or the parts may be welded or otherwise fastened. The rear cross piece 31 is fitted with securing elements 33 which receive the hanger straps 27.

The assembled safety seat is shown in FIG. 3 in which the hanger 29 is draped over the back 34 of the car seat. The hanger straps 27 are connected to the securing elements 33 and prevent the child from rising. The straps 24 prevent the child from moving away from the back 34 and hold the child in an erect sitting position. The shoulder straps 21 prevent the child from climbing out of the seat 10.

In use, the sack body 11 is secured to the back 34 and to the hanger 29 by straps 24 and 27 and the chest portion 13 is laid out upon the seat 35. The child is then seated over the crotch portion 12 and the chest portion 13 is elevated between the child's legs and side securement is then effected using the zippers 17 with whichever of the zipper rows 16 best fits the child. The straps 21 are then passed over the child's shoulders and secured at the chest portion 13 to the buckles 23.

I claim:

A safety car seat for securely holding a child in normal sitting position upon the seat of a car comprising a sack body of flexible material made in one piece for encasing the child consisting essentially of a chest portion, a back portion, side portions laterally extending from said back portion and a crotch portion interconnecting said chest and back portions, means for adjusting the fit of the sack to the child including a zipper row on each side of the said chest portion and a pair of laterally spaced zipper rows on each of said side portions to adjust in secured relation the perimeter of said chest portion and to secure said side portions and back portion to said chest portion, adjustable and releasable strap means secured to said back portion and extending downwardly therefrom to encircle the back of the seat of the car at a location inaccessible to said child in normal sitting position, means to secure the free end of said strap means to the said back portion at the upper end thereof, a rigid hanger for said sack comprising a pair of arcuate metal straps and a plurality of cross pieces secured thereto adapted to be draped over the back of the car seat, said hanger including securing means for releasably securing the free end of hanger straps carried by said strap means, and means adapted to interconnect said strap means with said hanger positioned on the back of said car seat at a point intermediate the length of said strap means.

References Cited in the file of this patent

UNITED STATES PATENTS

| | | |
|---|---|---|
| 450,394 | Billeaux | Apr. 14, 1891 |
| 1,368,466 | Tyler | Feb. 15, 1921 |
| 1,616,349 | Cagle | Feb. 1, 1927 |
| 2,170,703 | Waxman | Aug. 22, 1939 |
| 2,305,304 | Pescara | Dec. 15, 1942 |
| 2,351,749 | Elmer | June 20, 1944 |
| 2,635,245 | Nigro | Apr. 21, 1953 |
| 2,652,183 | Hlivka | Sept. 15, 1953 |
| 2,685,331 | Gauntlett | Aug. 3, 1954 |
| 2,833,343 | Benson | May 6, 1958 |
| 2,852,066 | Hawkins | Sept. 16, 1958 |
| 2,940,443 | Baker | June 14, 1960 |

FOREIGN PATENTS

| | | |
|---|---|---|
| 1,142,712 | France | Apr. 1, 1957 |